United States Patent [19]

Bijen

[11] 4,267,136
[45] May 12, 1981

[54] PRODUCTION OF THIN, PLASTIC-REINFORCED, HYDRAULICALLY BOUND BOARDS

[75] Inventor: Jan M. J. M. Bijen, Munstergeleen, Netherlands

[73] Assignee: Stamicarbon, B.V., Geleen, Netherlands

[21] Appl. No.: 937,134

[22] Filed: Aug. 28, 1978

[30] Foreign Application Priority Data

Aug. 30, 1977 [NL] Netherlands .......................... 7709522

[51] Int. Cl.³ .............................................. B28B 23/00
[52] U.S. Cl. ...................................... 264/87; 264/257; 264/308; 264/333; 264/DIG. 47; 428/255
[58] Field of Search ................ 264/87, 136, 257, 308, 264/147, DIG. 47, 333; 162/108, 120, 154; 428/36, 255

[56] References Cited

U.S. PATENT DOCUMENTS

| 1,353,225 | 9/1920 | Donoghue | 264/136 X |
| 2,295,420 | 9/1942 | Moore | 264/257 |
| 3,833,438 | 9/1974 | Kaneko | 264/87 X |

FOREIGN PATENT DOCUMENTS

| 155156 | 2/1954 | Australia | 162/120 |
| 1130612 | 10/1968 | United Kingdom . | |

*Primary Examiner*—Thomas P. Pavelko
*Attorney, Agent, or Firm*—Cushman, Darby & Cushman

[57] ABSTRACT

A continuous process for manufacturing composite articles, such as thin hydraulically bound boards, which are reinforced with separate layers of a stretched, fibrillated, extended plastics net reinforcing material is disclosed. An aqueous suspension of cement or other material is applied onto and into the plastics network, dewatered, taken up and rolled into a composite cylinder until the desired thickness is reached. The cylinder is then cut axially, given the desired shape and cured.

6 Claims, 1 Drawing Figure

U.S. Patent
May 12, 1981
4,267,136
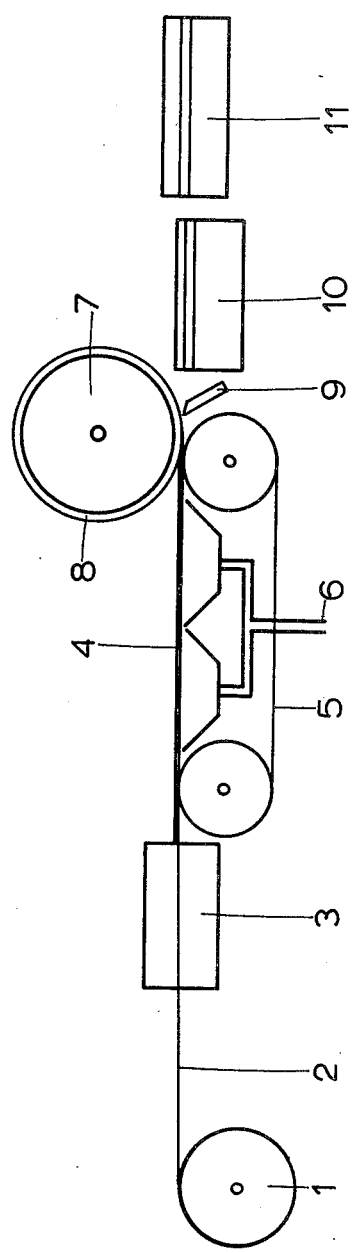

PRODUCTION OF THIN, PLASTIC-REINFORCED, HYDRAULICALLY BOUND BOARDS

BACKGROUND OF THE INVENTION

This invention relates to the production of composite articles of cement or the like which are reinforced with an extended fibrillated net-shaped plastics material and to the articles so produced. According to the disclosed process objects consisting of a hydraulic binding material in which a reinforcing material is incorporated, are produced by forming a thin layer from an aqueous suspension of the hydraulic binding material and the reinforcing material, this layer being partly dewatered, rolled on a forming roller, removed from the forming roller once the desired thickness is obtained, shaped into its final form and then hardened.

As used in the present application the term hydraulically bound material means a composite of a binder and possibly various additives, which is hardened or bound by reaction with water. The starting material for the hydraulically bound material may be cement including calcium aluminium silicate cement, calcium oxide and silicondioxide, gypsum, all of the Portland cements of the various types, aluminous cements, puzzolanic cements (including cements derived from industrial slags), white cements, natural cements and in general all of the commercially available hydraulic cements.

Various reinforcing agents to these materials are well known. For instance the use of a reinforcement in the form of fibers, either synthetic or natural fibers, prepared with and mixed into hydraulically bound material is known. Also separate fibers may be incorporated in a criss-cross distribution throughout the article or in layers of separate fibers. A system where various fibers are incorporated into articles as a reinforcement in the form of a mat of fibers is also known. Additionally, reinforcement by means of incorporation of a plurality of layers of a net formed from a stretched and fibrillated plastics film is known as well. The product thus obtained is qualitatively better than one with fibers distributed criss-cross.

In a similar manner it is also known to continuously form articles with a fiber reinforcement made from hydraulically bound material, reinforced with separate fibers, in continuous processes. As an example there are the articles made of what is termed asbestos cement.

Prior to the process of the present invention it has not been possible to form on a continuous process basis relatively thin objects by the continuous application of a net fiber reinforcement such that the net reinforcement is present in a large number of layers.

DETAILED DESCRIPTION OF THE INVENTION

An object of the present invention is to provide a method for the production of articles consisting of a hydraulically bound material in which a reinforcing material is incorporated, in which process a thin layer of an aqueous suspension of the hydraulically bound material and the reinforcing material is formed, the resulting layer is partially dehydrated, rolled on a forming roller, removed after a predetermined thickness has been obtained, shaped into its final form and hardened.

According to the present invention these and other objects are achieved if the reinforcing material is a net which is formed by stretching a plastics film, fibrillating it and extending it to form a net.

Thus according to the process of the present invention the following sequential steps are carried out:

a. A net of the type described is brought into contact in the form of a continuous belt with the aqueous suspension of the material to be hydraulically bound, so that a thin layer is formed from the net and the suspension applied thereto;

b. this thin layer is removed at the same speed as the net is supplied, excess water is extracted and the stretched net is simultaneously kept at the predetermined width;

c. the dewatered, thin layer is then rolled up on the forming roller until the number of continuous net layers as desired in the final product is obtained;

d. the thickness of the dewatered thin layer is adjusted so that with the desired number of continuous net layers on the forming roller the desired thickness of the final product is also obtained.

A net of stretched fibrillated plastics film used as a reinforcing material is obtained by known processes, such as by extruding a plastics film to form foil, then if desired, cutting it into tapes and stretching it mono-axially to, for instance, about eight times it original length, so that the material is converted to a state of imminent fibrillation. Fibrillation is then obtained by leading the material over a nail-studded roller or brush. A continuous belt of such a net can consist of a roll of this material but can also be obtained by direct feed from an extruder, the extruded film being stretched between the extruder nozzle and the place where it is brought into contact with the hydraulic binding material, fibrillated and extended to the correct size. Such nets are known per se and described in the literature. See U.S. Pat. Nos. 2,943,356, 3,296,351, 3,501,565, 3,719,540, 3,503,836, 3,906,073. The nets preferably consist of polyolefins, especially polypropylene.

The aqueous suspension of the material to be hydraulically bound with which the net is brought into contact includes the hydraulic binder, water and optionally other additives. As the hydraulic binder there may be used cement (calcium aluminum silicate), calcium oxide and silicon dioxide or gypsum.

By a thin layer is meant a layer of the net and the hydraulically binding suspension in which the net is only barely incorporated or covered in a layer of the suspension. It will be apparent that by varying the consistency and composition of the suspension it is possible to influence the thickness of this thin layer and as a consequence the properties of the articles to be made.

The thin layer thus formed is picked up by means of a carrier belt and transported away at a speed which is equal to the supply or feed-in speed of the net. During this transport excess water is removed from the thin layer, if necessary. It has been found that a suitable material for the carrier belt is felt. The dewatering of the thin layer on the carrier belt can be augmented or speeded up by a suction device fitted under the belt by which means water is lead away from the thin layer of suspension which is in and on the net. A further important function of the carrier belt and the removal of water by suction is to keep the stretched net at the proper width. The net is thus set in the thin-layer compound which has to be hydraulically bound.

At the end of the carrier belt the thin layer is wound onto the forming roller and this winding continues until a composite, multilayered shape of the desired thickness is obtained. Winding onto this roller offers possibilities for varying the desired qualities of the end product, in combination with the nature of the suspension to the net. On the one hand, the dewatered thin layer can be wound until the desired number of net layers is obtained for a certain thickness of the end product, while on the other hand the desired thickness can be obtained with a limited number of net layers and a different consistency of the suspension, thus the consistency of suspension and number of layers wound are independently variable.

After the desired thickness has been obtained, the assembly of thin layers formed on the forming roller is cut, preferably parallel to the axis of rotation of the roller, and separated both from the thin layer on the carrier belt and from the forming roller. The composite layer, still plastic and formable, is then shaped into its final form such as a sheet, corrugated sheet, tray or tube, according to known procedures and then subject to a setting process which itself is also well known.

The stretched and fibrillated plastic film net can be brought into contact with the suspension in various manners some of which are specified as follows:

1. The cylindrical sieve method—in this case the endless belt of net is brought into contact with the aqueous suspension of the material to be hydraulically bound by submerging the net in the suspension in contact with a sieve. The sieve may be a so-called cylindrical sieve, i.e. a rotating drum with a perforated wall, within which there is a partial vacuum. The thin layer is already formed on the perforated wall and then led to the carrier belt. The carrier belt itself can also be used for this purpose;

2. The pouring method—in this method the suspension is contained in a distributor from which it is poured over the net as it is supplied which is already on the carrier belt;

3. The spraying and sprinkling method—in this method also the net is fed directly onto the carrier belt. The net is brought into contact with the suspension by means of sprinklers installed above the carrier belt and the thin layer is thus formed.

After the net and the suspension have been brought into contact, so that the thin layer is formed according to any of the above-listed methods, the same processing subsequent processing operations are used.

BRIEF DESCRIPTION OF THE DRAWING

The attached drawing is a schematic representation of apparatus for conducting the process of the present invention.

DETAILED DESCRIPTION OF THE DRAWING

As shown in the drawing stretched and fibrillated net 2 is led as a continuous belt from, for example, a roller or extruder 1 to a suspension contact device 3 in which the contact between the net and the aqueous suspension of the hydraulic binding material occurs. The aqueous suspension of hydraulically bound material is prepared according to known procedures and is not shown. Consistency of the aqueous suspension thus prepared and thickness of application are matters conveniently controlled by the skilled operator. The thin layer 4 formed in application device 3 is taken up by carrier belt 5 and led to the forming roller 7. During its transport on carrier belt 5 the thin layer 4 is dewatered, which process can be supplemented or accelerated by suction system 6. The net is also given a predetermined fixed width on this belt. The composite layer 8 formed by the winding several layers of the largely dewatered thin layer 4, within which the net will now remain at a fixed width, onto the forming roller 7. When the desired composite thickness is reached the wound roll is cut from the thin layer 4 and from the forming roller 7 by a cutting device 9. The still plastic composite layer 8 is taken from forming roller 7 to a shaping device 10 in which the composite layer 8 is given its final desired form and then to a hardening device 11. Shaping and hardening are carried out according to known procedures.

Various operational parameters and alternative embodiments of the present invention will be apparent from the above disclosure and drawing. As an example by means of carefully undertaken measures the method described above can be made suitable, together with a portion of a device used for making articles of asbestos cement, for carrying out a method for the continuous production of a substitute for asbestos-cement objects, more specifically it would be possible to apply a plastics reinforcement in the form of a net instead of fibers with a criss-cross distribution. Thus without excessive complications it is possible to adapt existing production equipment to the continuous manufacture of a net-reinforced product. An important difference between the old method of making the existing product and the continuous one as described above for its substitute consists in the way in which the hydraulically binding compound and the reinforcement material are brought into contact with each other, and particularly in which reinforcing material is led to an aqueous suspension of hydraulic binding material.

The present invention in its apparatus aspect includes an installation for making thin boards of hydraulically bound material reinforced with stretched, fibrillated plastics foil which has been extended to form a net. The installation consists of supply or feed-in means for the net, means for bringing the net into contact with a suspension of the material to be hydraulically bound and for forming together a thin layer of the net and the aqueous suspension on and in the net, a carrier belt on which the thin layer of net and aqueous suspension is taken up and beneath which there are means for removing excess water from the thin layer and for setting the net, a forming roller on which the thin layer is wound to form a composite layer, a device for cutting the composite layer from the forming roller and the thin layer, a device for giving the composite layer its final form and shape, and a device for hardening the composite layer.

What is claimed:

1. A continuous process for the manufacture of composite articles consisting of a hydraulically bound material having an extended net plastics material incorporated therein, said process including the successive steps of (a) contacting a stretched, fibrillated, extended plastics net reinforcing material in the form of a continuous belt with an aqueous suspension of hydraulic binding material thereby forming a thin layer of aqueous suspension on and in the net while adjusting the rate of application and thickness of the thin layer as it is formed;

(b) removing excess water from the thus formed thin layer;

(c) rolling the dewatered thin layer onto a forming roller and continuing such rolling until the predetermined number of continuous net layers desired in the final product are formed in the composite;

(d) removing the rolled composite from the roller when the predetermined thickness is obtained;

(e) shaping the composite; and (f) hardening the shaped composite to form the desired shaped composite article.

2. The process as claimed in claim 1 wherein the continuous belt of net is contacted with the aqueous suspension by immersing the net in the suspension in contact with a sieve.

3. The process as claimed in claim 1 wherein the net is contacted with the aqueous suspension by sprinkling or spraying the aqueous suspension onto the net.

4. The process as claimed in claim 1 wherein the net is contacted with the aqueous suspension by pouring the aqueous suspension over the net.

5. The process as claimed in claim 1, 2, 3 or 4 wherein a plastics film is extruded, stretched and fibrillated, and expanded to form said net reinforcing material whereafter said resulting net reinforcing material is directly contacted with the aqueous suspension.

6. The process as claimed in claim 1 wherein the excess water in step (b) is removed by applying a partial vacuum to the thin layer.

* * * * *